United States Patent Office 3,284,437
Patented Nov. 8, 1966

3,284,437
WATER-INSOLUBLE MONOAZO-DYESTUFFS
Helmut Gies, Hofheim, Taunus, and Helmut Lindner and Arthur Siebert, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 13, 1964, Ser. No. 403,642
Claims priority, application Germany, Oct. 25, 1963,
F 41,086
7 Claims. (Cl. 260—207)

The present invention provides water-insoluble monoazo-dyestuffs and a process for preparing them. The invention relates in particular to dyestuffs of the general Formula 1

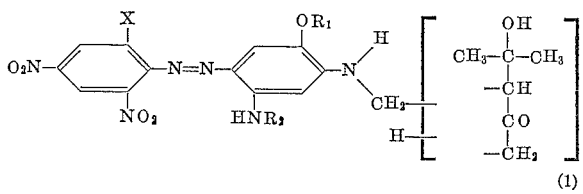

(1)

in which X represents a hydrogen, chlorine or bromine atom, $R_1$ represents a lower alkyl group which may be substituted by hydroxy, alkoxy or acyloxy groups, and $R_2$ represents a formyl or

lower alkyl group.

The present invention is based on the observation that very valuable water-insoluble monoazo-dyestuffs of the above-indicated Formula 1 can be prepared by coupling a diazo compound of an amine of the general Formula 2

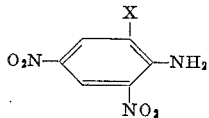

(2)

in which X represents a hydrogen, chlorine or bromine atom, in an acid medium with a coupling component of the general Formula 3

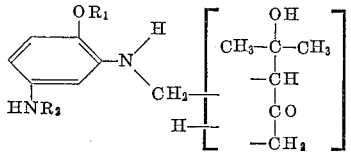

(3)

in which $R_1$ represents a lower alkyl group which may be substituted by hydroxy, alkoxy or acyloxy groups, and $R_2$ represents a formyl or

lower alkyl group. The coupling is advantageously brought about in a pH range of about 1 to 5.

Coupling components of general Formula 3 given above can be obtained by reacting an amine of the general Formula 4

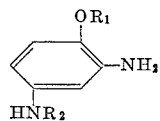

(4)

in which $R_1$ and $R_2$ have the meanings indicated above, with a Mannich base of 2-methyl-pentanol(2)on(4). Particularly suitable Mannich bases are those that are obtained by the action of dialkyl amines and formaldehyde on 2-methyl-pentanol(2)on(4). From diethyl amine, formaldehyde and 2-methyl-pentanol(2)on(4), for example, is obtained a Mannich base of the formula

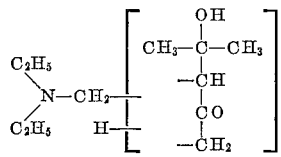

which, when subjected to a further reaction with an amine of general Formula 4 indicated above, yields coupling components of the formula

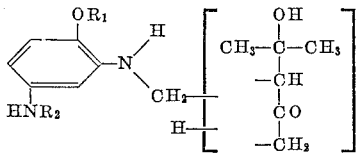

The novel monoazo-dyestuffs obtained according to the invention dye as dispersion dyestuffs semi- or fully synthetic fibres such, for example, as acetate silk and polyethylene terephthalate fibres, violet to blue shades and in admixture with other dyestuffs are suitable for producing black shades. The dyeings obtained are distinguished by a good fastness to light and a very good fastness to thermofixation.

The following examples serve to illustrate the invention but they are not intended to limit it thereto, the parts being by weight.

Example 1

21.7 parts of 2,4-dinitro-6-chloroaniline were diazotized in usual manner in 50 parts of glacial acetic acid with nitrosylsulphuric acid. The diazo solution obtained was run slowly, while vigorously stirring and while adding 300 parts of ice, into a solution of a coupling component in hydrochloric acid, which solution had been prepared by boiling the hydrochlorate of the diethylaminomethylene compound (Mannich base) of 2-methyl-pentanol(2)on(4) which had been obtained from 8.6 parts of 2-methyl-pentanol(2)on(4), 16.5 parts of diethyl aminohydrochloride and 6 parts of formaldehyde, for one hour with 19.4 parts of 2-amino-4-acetaminophenetole in 100 parts of water, and by subsequently adding 30 parts of 5 N-hydrochloric acid. The coupling was carried out at a temperature within the range of $-2°$ to $+2°$ C. After the addition of the diazo solution was terminated, stirring was continued for another 3 hours. Then the dark blue dyestuff which had precipitated was sucked off, washed with water until neutral and dried at a temperature within the range of $50°$ to $60°$ C. An aqueous dispersion of this dyestuff which had been prepared in usual manner dyed polyester fibres navy blue shades. The dyeings possessed a good fastness to light and to sublimation.

A dyestuff of similar dyeing properties was obtained when using instead of 2,4-dinitro-6-chloraniline 26.3 parts of 2,4-dinitro-6-bromoaniline.

Example 2

18.3 parts of 2,4-dinitroaniline were diazotized in usual manner and the resulting diazo solution was run into a hydrochloric acid solution of a coupling component which differed from the coupling solution described in Example 1 only by the fact that instead of 19.4 parts of 2-amino-4-acetaminophenetole 18.0 parts of 2-amino-4-acetaminoanisole had been used for its preparation. While the diazo solution was introduced into the coupling solution 300 parts of ice were added. When the introduction of the diazo solution was terminated stirring was continued for another 3 hours. The dyestuff which had precipitated was filtered off and washed well with water. After drying, about 40 parts of a brownish black dyestuff powder were obtained which dyed polyethylene terephthalate fibres bluish violet shades by a usual dyeing method. The dyeings obtained possessed a good fastness to light and to sublimation.

When replacing the 18.0 parts of 2-amino-4-acetaminoanisole used for the preparation of the coupling component by 16.6 parts of 2-amino-4-formaminoanisole a dyestuff of very similar dyeing properties was obtained.

*Example 3*

26.3 parts of 2,4-dinitro-6-bromoaniline were diazotized in 50 parts of glacial acetic acid with nitrosylsulphuric acid and the resulting diazo solution was run into a hydrochloric acid solution of a coupling component which had been obtained in the manner described in Example 1 from 18.0 parts of 2-amino-4-formaminophenetole and the diethyl aminomethylene compound from 16.5 parts of diethyl aminohydrochloride, 8.6 parts of 2-methylpentanol(2)on(4) and 6 parts of formaldehyde. While the diazo solution was run into the coupling solution 300 parts of ice were added. After the coupling the dyestuff was isolated and dried in usual manner. About 45 parts of a black powder were obtained which when applied to fibres by a usual dyeing method yielded blue-black shades of good fastness to light and to sublimation.

When instead of the 26.3 parts of 2,4-dinitro-6-bromoaniline 21.7 parts of 2,4-dinitro-6-chloroaniline were used as the diazo component a dyestuff of very similar dyeing properties was obtained.

We claim:
1. The monoazo-dyestuff insoluble in water of the formula

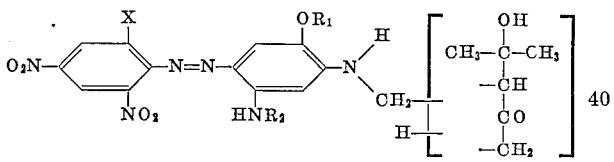

wherein X represent a member selected from the group consisting of hydrogen, chlorine and bromine, $R_1$ represents a lower alkyl group, and $R_2$ represents a formyl or

lower alkyl group.

2. The monoazo-dyestuff of the formula

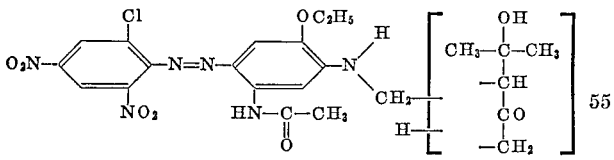

3. The monoazo-dyestuff of the formula

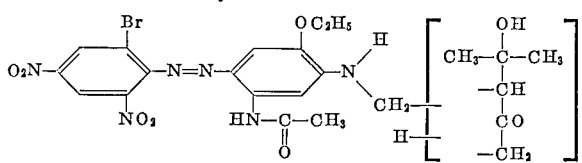

4. The monoazo-dyestuff of the formula

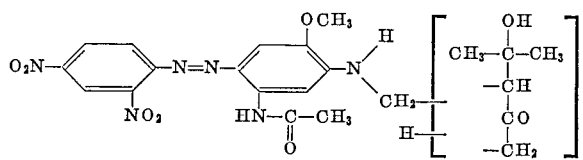

5. The monoazo-dyestuff of the formula

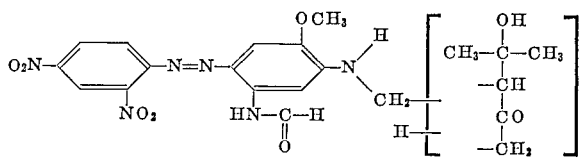

6. The monoazo-dyestuff of the formula

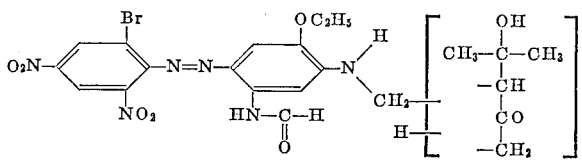

7. The monoazo-dyestuff of the formula

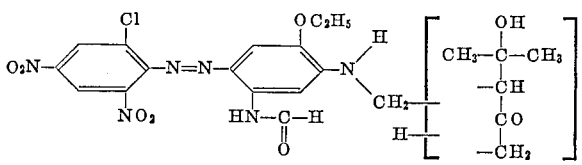

References Cited by the Examiner
UNITED STATES PATENTS

| | | | |
|---|---|---|---|
| 658,506 | 9/1900 | Ott et al. | 260—207 |
| 2,083,308 | 6/1937 | Senn | 260—207 |
| 2,111,300 | 3/1938 | Senn | 260—207 |
| 2,155,755 | 4/1939 | Felix et al. | 260—207 |

FOREIGN PATENTS

| | | |
|---|---|---|
| 666,057 | 2/1952 | Great Britain. |
| 1,261,580 | 4/1961 | France. |

CHARLES B. PARKER, *Primary Examiner.*
FLOYD D. HIGEL, *Assistant Examiner.*